Figure 1:
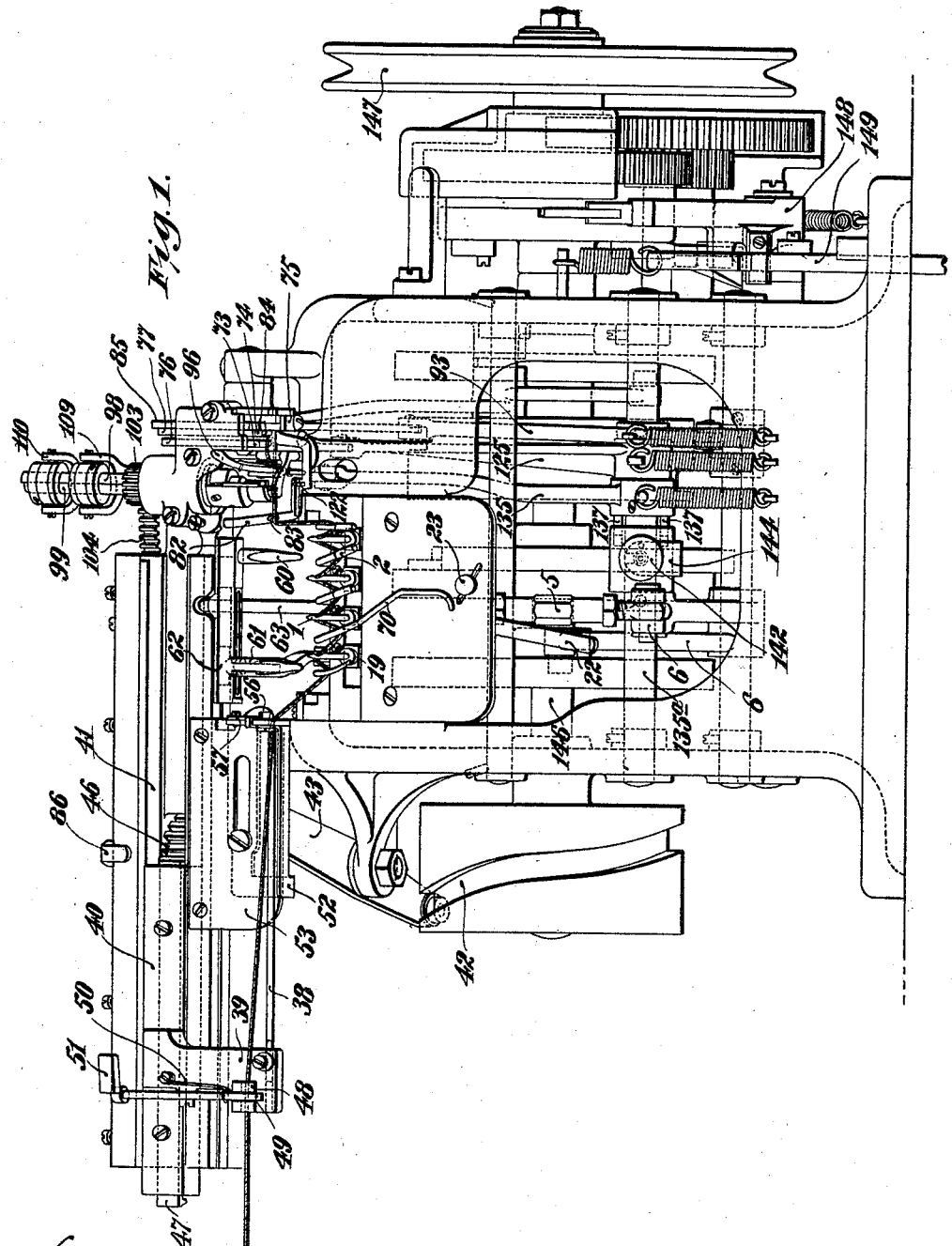

H. E. ENSLIN.
MACHINE FOR LACING SHOE UPPERS.
APPLICATION FILED JAN. 30, 1908.

1,030,573.

Patented June 25, 1912.
7 SHEETS—SHEET 1.

Witnesses:
E. C. Wurdeman
N. D. McPhail

Inventor:
Herbert E. Enslin
by
Phillips Van Everen & Fish
Attys

H. E. ENSLIN.
MACHINE FOR LACING SHOE UPPERS.
APPLICATION FILED JAN. 30, 1908.

1,030,573.

Patented June 25, 1912.
7 SHEETS—SHEET 2.

Witnesses:
E. C. Wurdeman
N. D. McPhail

Inventor:
Herbert E. Enslin
by
Phillips Van Everen & Fish
Attys.

H. E. ENSLIN.
MACHINE FOR LACING SHOE UPPERS.
APPLICATION FILED JAN. 30, 1908.
1,030,573.
Patented June 25, 1912.
7 SHEETS—SHEET 3.
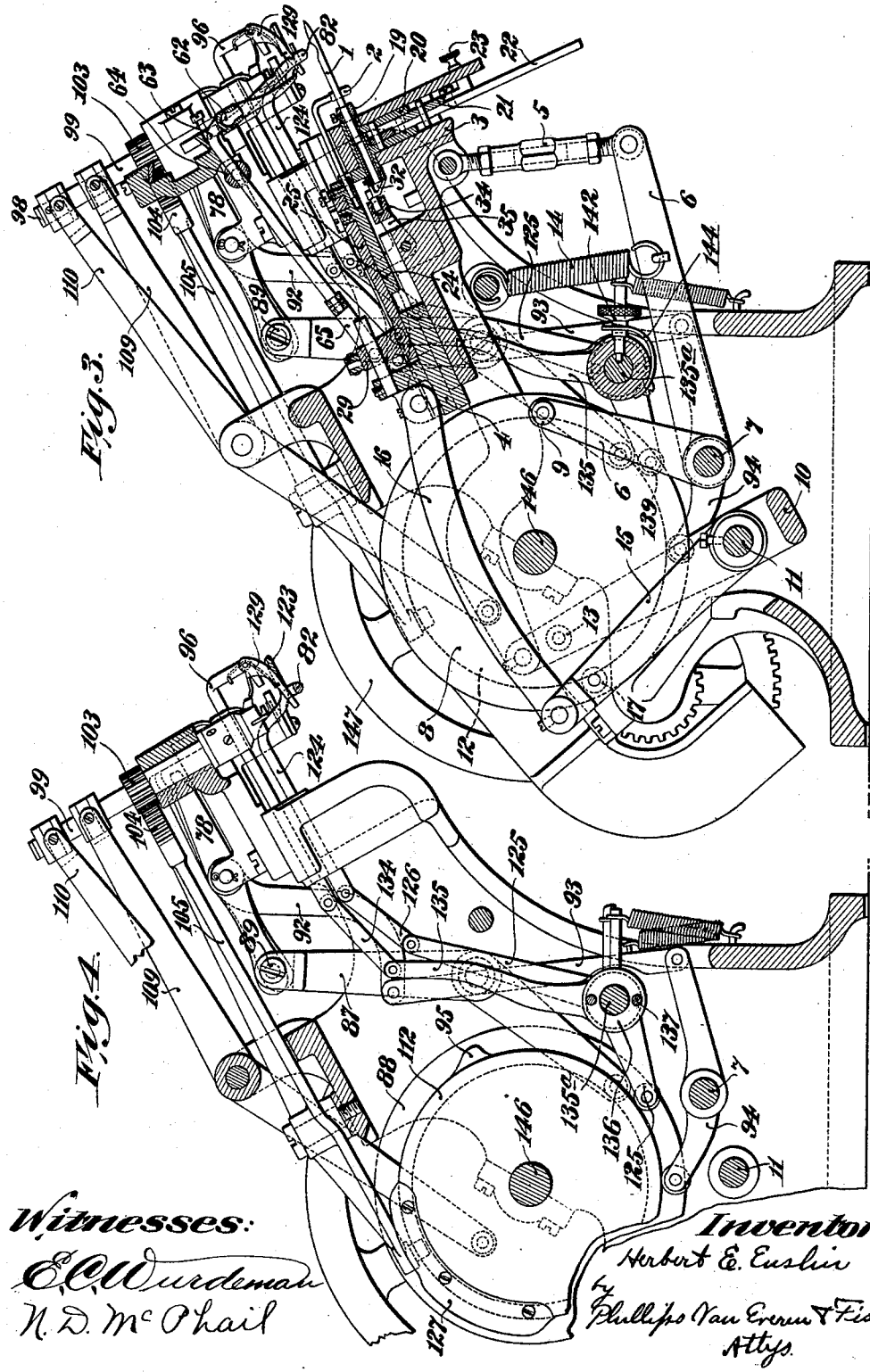
Witnesses:
E. C. Wurdeman
N. D. McPhail
Inventor:
Herbert E. Enslin
by Phillips Van Everen & Fish
Attys.

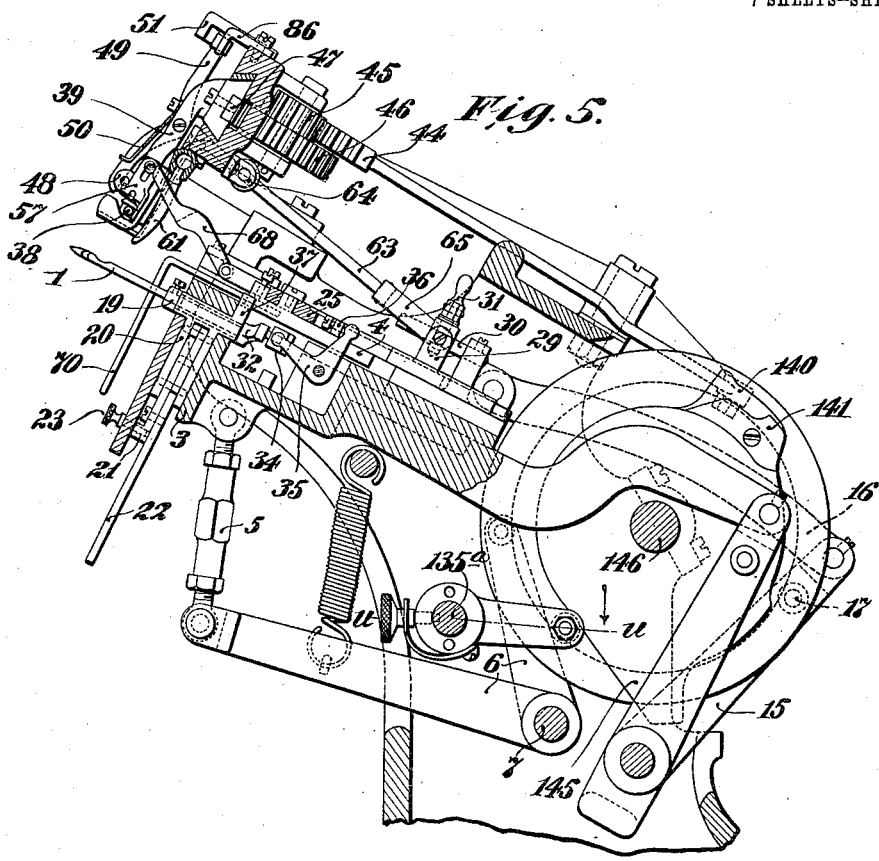
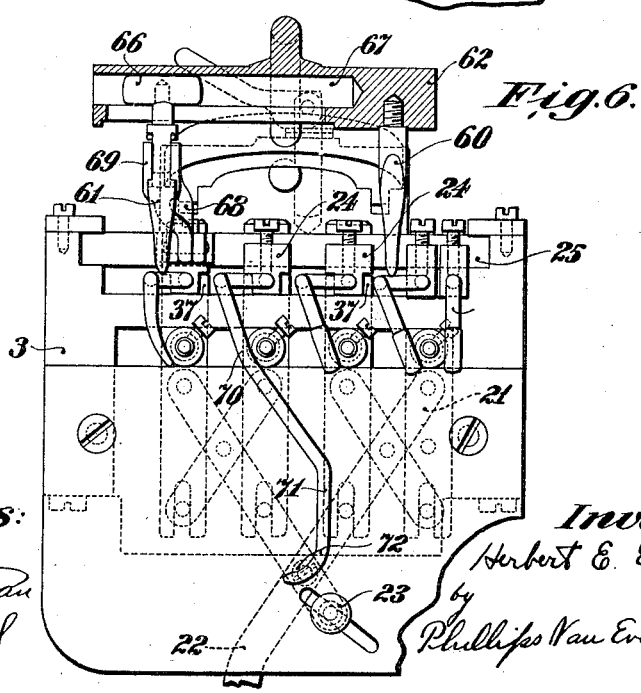

H. E. ENSLIN.
MACHINE FOR LACING SHOE UPPERS.
APPLICATION FILED JAN. 30, 1908.
1,030,573.
Patented June 25, 1912.
7 SHEETS—SHEET 5.
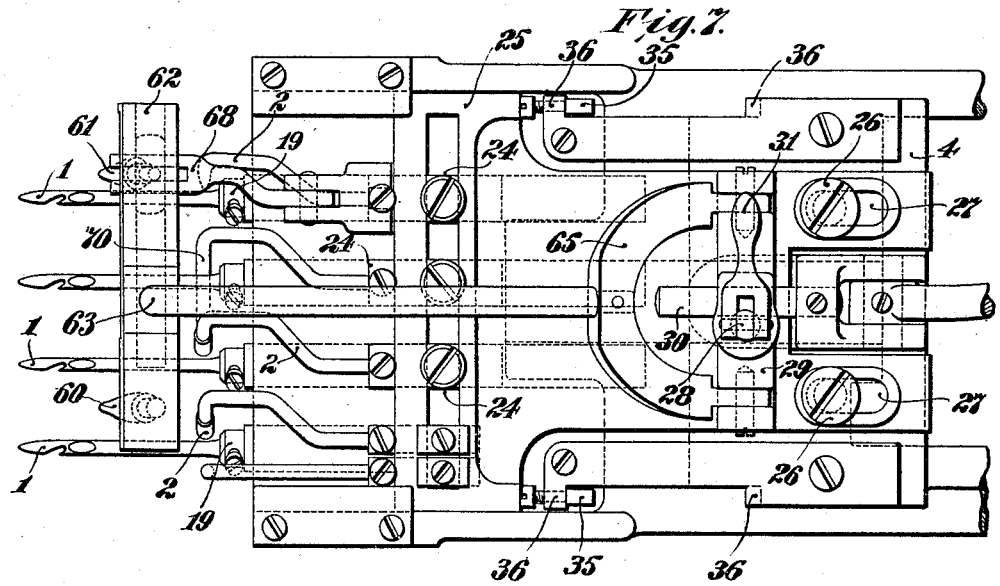
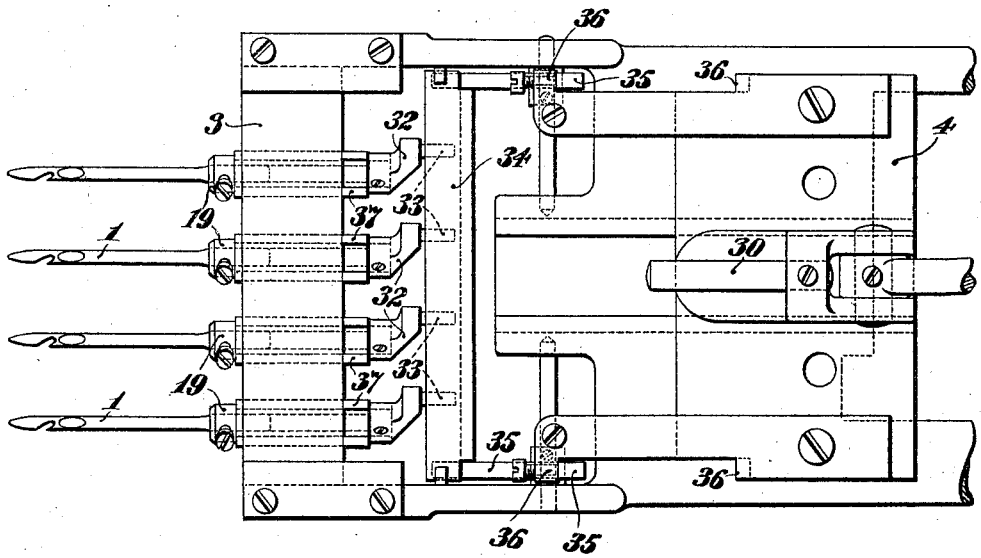

H. E. ENSLIN.
MACHINE FOR LACING SHOE UPPERS.
APPLICATION FILED JAN. 30, 1908.
1,030,573.
Patented June 25, 1912.
7 SHEETS—SHEET 6.
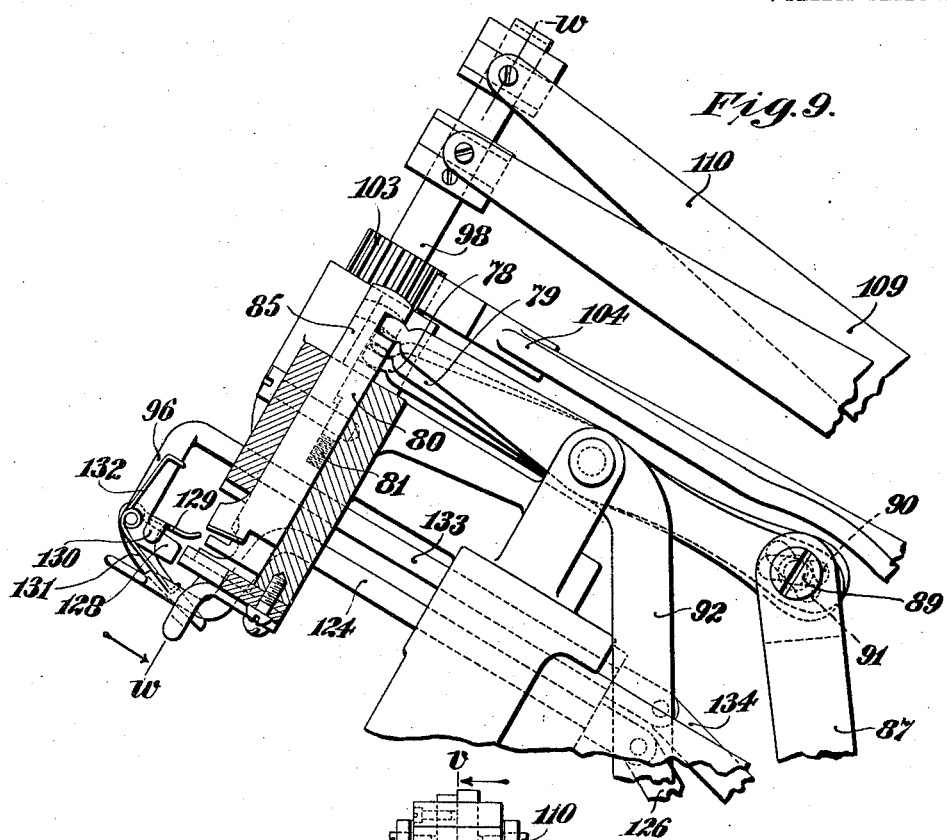
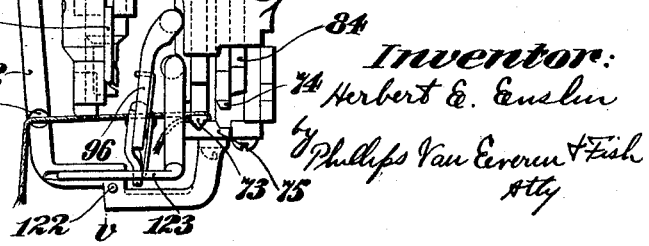

H. E. ENSLIN.
MACHINE FOR LACING SHOE UPPERS.
APPLICATION FILED JAN. 30, 1908.
1,030,573.
Patented June 25, 1912.
7 SHEETS—SHEET 7.
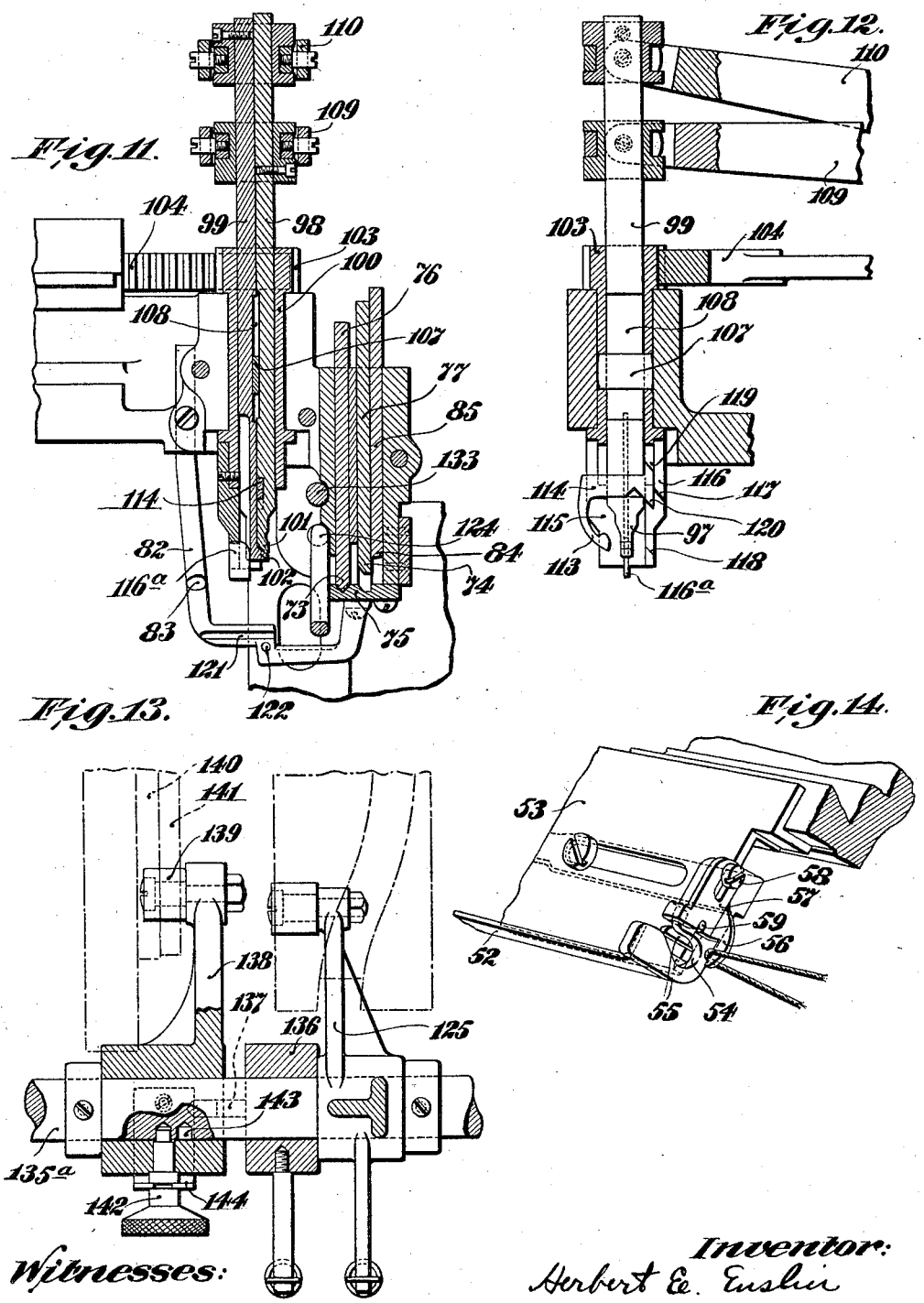

UNITED STATES PATENT OFFICE.

HERBERT E. ENSLIN, OF MALDEN, MASSACHUSETTS, ASSIGNOR TO UNITED SHOE MACHINERY COMPANY, OF PATERSON, NEW JERSEY, A CORPORATION OF NEW JERSEY.

MACHINE FOR LACING SHOE-UPPERS.

1,030,573.  Specification of Letters Patent.  Patented June 25, 1912.

Application filed January 30, 1908. Serial No. 413,343.

*To all whom it may concern:*

Be it known that I, HERBERT E. ENSLIN, citizen of the United States, residing at Malden, in the county of Middlesex and State of Massachusetts, have invented certain new and useful Improvements in Machines for Lacing Shoe-Uppers; and I do hereby declare the following to be a full, clear, and exact description of the invention, such as will enable others skilled in the art to which it appertains to make and use the same.

The invention relates to machines for lacing together the eyeleted quarters of shoe uppers preparatory to placing them on the last for the lasting and other operations in order that the edges of the lacing slit shall be held at the proper distance apart, and the upper properly fitted to the last during the lasting operation.

The features of the invention may be embodied with special advantage in that class of machines in which the lace inserting mechanism comprises a plurality of spindles or needles arranged to pass a series of loops of lacing cord through the eyelet holes of an upper, an example of which is shown in Patent No. 779,008, dated January 3, 1905. The broader features of the invention are not limited, however, to this form of machine, but may be embodied with advantage in other forms of machines, and the specific construction and arrangement of the various parts may be varied as may be found desirable or best suited to the form of machine in which the invention is embodied, and to the construction and arrangement of lace inserting devices and the devices coöperating therewith.

The primary object of the invention is to provide a shoe upper lacing machine having its various parts so constructed and arranged that the operations incident to the lacing together of the quarters of the upper may be performed at a high rate of speed and in a uniformly reliable and satisfactory manner.

A further object is to so construct and arrange the parts of the machine that they may be readily and conveniently adjusted or their operation modified to secure such manipulation or control of the lacing cord and of the work as is best suited for inserting lacing in the particular style or size of shoe upper which is to be operated upon.

With these objects in view, one feature of the invention contemplates the provision in a machine in which a lacing cord is inserted in the eyelet holes, and the ends of the lacing knotted together, of means for providing slack in the lower portion of the lacing, so that the slack in the lacing will readily and properly distribute itself between the various pairs of eyelets to hold the edges of the lacing slit in proper relation to each other when the upper is drawn over the last.

In lacing machines in which the lacing cord is inserted in the eyelet holes of the upper, and the ends of the lacing knotted together, the upper has heretofore commonly been suspended from the knot-tying mechanism by the ends of the lacing during the knotting operation, and has been discharged by falling away from the knotting mechanism when the ends of the lacing are released. When the upper is thus suspended by the ends of the lacing after the lace has been inserted, substantially all the slack in the lacing is drawn into the upper portion of the lacing between the upper eyelet holes and the knotting mechanism. With the slack thus localized, it does not readily distribute itself between the various pairs of eyelets when the upper is drawn over the last, with the result that the lower eyelets are located too near together and the upper eyelets too far apart to secure the desired and proper relation between the edges of the lacing slit when the upper is lasted. This localization of the slack in the lacing at the upper portion of the lacing is especially undesirable in lacing bluchers, in which the lower eyelets should be a considerable distance apart when the upper is in proper position upon the last.

In accordance with the present invention, the proper distribution of the lacing is insured by means which act to insure the presence of slack in the lower portion of the lacing, which readily distributes itself between the lower pairs of eyelets to secure the proper spacing of the edges of the lacing slit when the upper is lasted. In embodying this feature of the invention in a machine in which the lace inserting mechanism comprises a series of needles or spindles, and a series of looper fingers coöperating therewith to form a series of loops in the lacing cord, which are passed through the eyelet holes of the upper, it is preferred to extend one of the looper fingers so that it will form a device for engaging and sustaining the lower portion of the lacing when the upper is removed from the needles, and during the tying together of the ends of the lacing. This cord-engaging device or extension of the looper finger thus acts to retain a certain amount of slack in the lower portion of the lacing, and it is preferably so formed that the lacing will remain in engagement therewith after the ends of the lacing have been released, so that the upper as it falls is momentarily suspended from this thread-engaging device, and thus a further amount of slack is drawn into the lower part of the lacing.

A further feature of the invention contemplates the provision in a machine in which the lace-inserting mechanism comprises a plurality of needles and means coöperating therewith to form a series of loops in the lacing cord, of means whereby the proper relation between the needles and the coöperating looping means is automatically maintained in adjusting the needles to correspond to the spacing of the eyelets of the upper to be operated upon. This contributes to the convenience and rapidity with which the proper adjustment may be made to enable lacings to be inserted in uppers having differently spaced eyelets. In machines in which the means coöperating with the needles to form the loops consist of a plurality of looper fingers, the means for maintaining the loopers and needles in proper relation to each other may and preferably does consist of devices connecting those loopers which should be moved laterally in securing the proper adjustment of the loopers and needles with the corresponding needles, so that in actuating the mechanism which varies the spacing of the needles the proper movements will be imparted to the looper fingers.

A further feature of the invention contemplates the provision in a machine in which the lace is inserted by passing a series of loops of lacing cord through the eyelet holes of an upper, and then passing a locking cord through the loops, of a novel form and arrangement of work positioner which acts to hold or to position and hold the upper out of the path of the needle or other means for passing the locking cord through the loops during the passage of said cord through the loops.

In accordance with one feature of the invention, the action of the work positioner is rendered automatic, so that the work is properly positioned and retained in position during the passage of the locking cord through the loops without any attention or care on the part of the operator.

In accordance with a further feature of the invention, the work positioning device is so constructed that it may be adjusted to act uniformly and properly upon uppers having differently spaced eyelets.

In accordance with a further feature of the invention the work positioning device is provided with a work engaging finger arranged to engage the upper close to the lower eyelets and thus insure the positioning of this part of the upper out of the path of the cord-carrying means. This feature of the invention is of especial advantage in insuring the proper action of the machine upon bluchers, in which the lower edges of the quarters are free from the vamp. In acting upon this form of upper, the work-engaging finger engages the free edge of the quarter and retains it out of the path of the cord-carrying means. In order that this thread-engaging finger may be maintained in proper relation to the loop-forming means when said means is adjusted for differently spaced eyelets, provision is made for adjusting the finger to correspond to the adjustment of the loop-forming means, and this adjustment is preferably secured by providing connections between the needle or other device which forms the loop to be passed through the lower eyelet and the thread-engaging finger, so that the finger will be moved with the loop forming device when said device is adjusted for different spacings of eyelets.

Further features of the invention relate to novel construction and arrangement of the mechanism for tying together the ends of the lacing and the parts which coöperate therewith to uniformly form and tighten the knot. The uniform tying and tightening of the knot, regardless of the amount of slack in the lacing, is insured by providing a gripper for gripping the lacing on the work side of the knot during the tightening of the knot, so that the tension put upon the knot is not affected by the amount of slack in the lacing, or by the weight of the upper in case it is suspended by the ends of the lacing. The gripper is preferably arranged to clamp the lacing between the knot-tying mechanism and the upper, and the tightening of the knot is preferably effected by the movement of the knot-tying mechanism away from the gripper.

Further features of the invention relate to novel construction and arrangement of the knotting mechanism, and devices coöperating therewith, which enable the knot to be tied close to the ends of the lacing, thus securing an economy in the amount of cord used; which enable the knot to be tied at some distance from the ends of the lacing when it is desired to remove the greater part of the slack in the lacing so that the edges of the lacing slit will be held close together when the upper is on the last; and which insure the proper operation of the knotting mechanism upon the ends of the lacing cord without danger of interfering with or preventing the proper operation of the lace-inserting devices.

Further features of the invention relate to the mechanism for severing the lacing cord from the supply thread.

The various features above referred to, as well as the further features relating more or less to the preferred form and arrangement of devices employed in embodying the broader features of the invention in a machine of the class shown in the patent above referred to, will be understood from an inspection of the accompanying drawings, in which—

Figure 2:
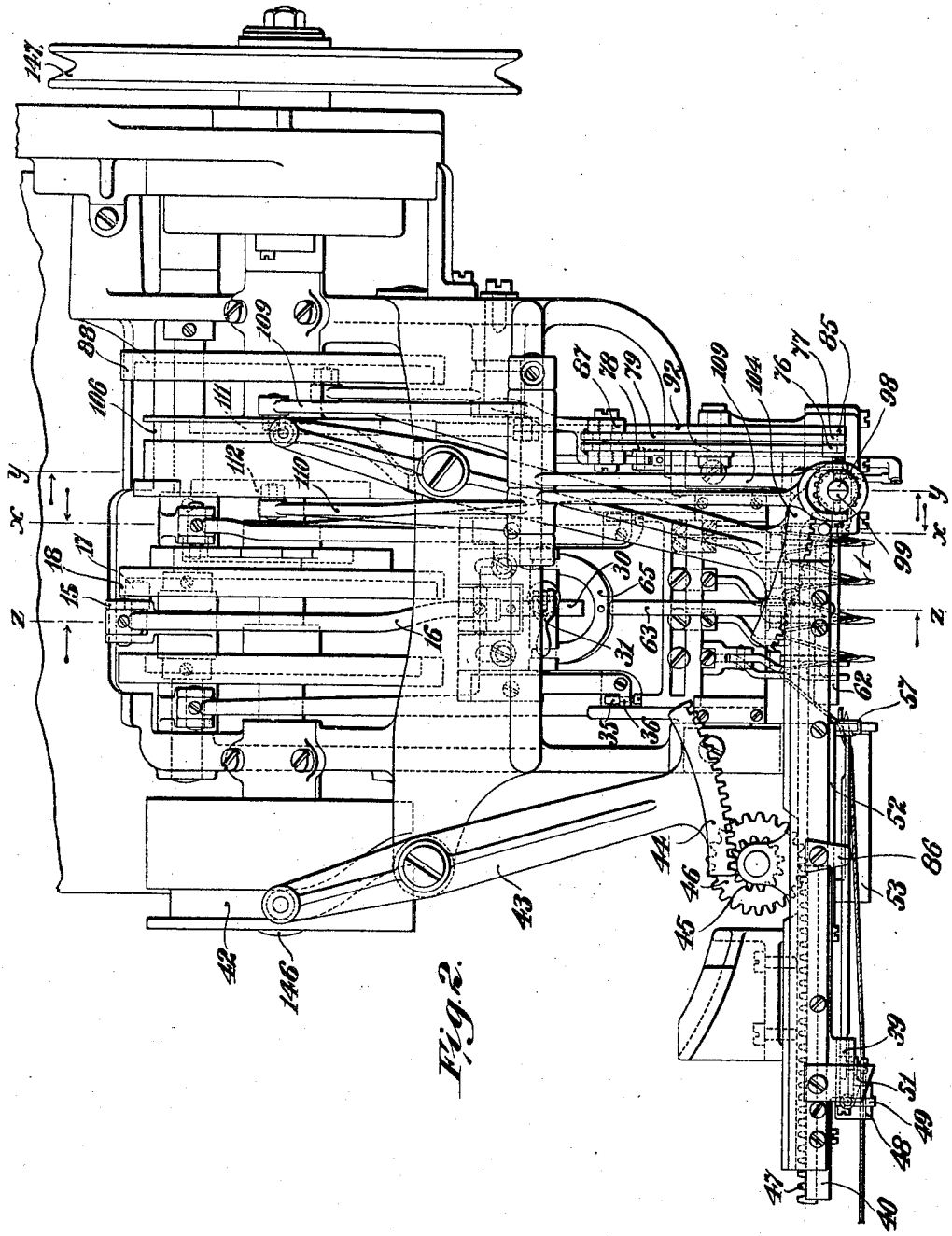

Figure 1 is a front elevation of the machine embodying the various features of the invention in their preferred forms, the parts being shown in the position which they occupy when the loops have been formed and are being held by the needles and looper fingers in position to be passed through the eyelet holes of the upper; Fig. 2 is a plan view of the machine; Fig. 3 is a vertical sectional view on line z—z, Fig. 2; Fig. 4 is a vertical sectional view on line y—y, Fig. 2; Fig. 5 is a vertical sectional view on line x—x, Fig. 2; Fig. 6 is a front view partly in section showing the front of the carrier for the looper needles and looper fingers and the work-positioning device; Fig. 7 is a plan view of the carrier for the looper needles and looper fingers; Fig. 8 is a similar view with the slide on which the looper fingers are mounted removed; Fig. 9 is a detail elevation partly in section of the devices for acting on the ends of the lacing; Fig. 10 is a front elevation of the parts shown in Fig. 9; Fig. 11 is a sectional view on line w—w, Fig. 9; Fig. 12 is a sectional view on line v—v, Fig. 10; Fig. 13 is a sectional view on line u—u, Fig. 5; and Fig. 14 is a detail view in perspective showing a device for giving additional slack thread in the lacing.

The machine illustrated in the drawings has the same general construction and mode of operation as the machine shown in the patent above referred to, and the construction and arrangement of the parts is substantially the same as the construction and arrangement of the parts in the machine shown and described in an application filed by W. A. Smith, January 16, 1906, Serial No. 296,388, which has matured into Patent 962,105, June 21, 1910, except where the construction and arrangement of the parts is modified or changed in embodying the features of the present invention in the machine.

The machine comprises a plurality of needles equal in number to the number of pairs of eyelet holes which it is desired to lace, a plurality of looper fingers coöperating with the needles to form a series of loops in a lacing cord and retain the loops in position until the shoe upper is placed on the needles, a cord feeding needle acting to place the cord in position to be engaged by the needles and looper fingers, and to pass a portion of the cord through the loops after they have been inserted in the eyelet holes of the upper, cord clamping grippers to hold the ends of the lacing, a cutter to sever the lacing from the cord supply, and a knot-tying mechanism acting to tie the ends of the lacing together.

The looper needles or spindles 1, of which there are four in the machine shown, are mounted in a carrier 3, and the coöperating looper fingers 2 are mounted on a slide 4 supported on the carrier. The front end of the carrier 3 is supported by a link 5 from one arm of a bell crank lever 6 which is pivoted on a shaft 7 and is rocked to give vertical movements to the carrier by a cam 8 engaging a cam roll 9 on the other arm of the lever. The rear end of the carrier is pivotally supported upon the arms of a yoke 10, which is pivoted upon a rod 11, and is rocked to give the carrier its forward and return movements by a cam 12 acting upon a roll 13 which is mounted on one of the arms of the yoke. The weight of the yoke is supported or partially supported upon a spring 14. Movements are imparted to the slide 4 which carries the looper fingers to move the looper fingers longitudinally of the needles through a lever 15 which is connected with the slide by a link 16, and is provided with a roll 17 engaging a cam 18.

The looper needles 1 are secured in spindles 19 which are mounted in blocks 20, and the blocks are mounted in guideways formed in the front of the carrier 3, so that the blocks may be adjusted to vary the spacing of the needles. One of the blocks shown at the right in Fig. 6 is secured in fixed position, while the others are mounted to slide laterally in the carrier in changing the spacing of the needles. The needle blocks are connected by links 21 pivoted to the blocks and pivotally connected together to form a lazy-tong connection between the blocks. One of the links is extended to form an operating lever or handle 22 by the movement of which the needle blocks may be simultaneously adjusted to vary the spacing of the needles. The needle blocks may be secured in adjusted position by means of a clamping screw 23 which passes through a slot in the front plate of the carrier and is threaded into one of the links 21.

The looper fingers 2 are secured in blocks 24 carried by a plate 25 which is secured upon the upper side of the looper finger slide 4. The plate 25 is held upon the upper surface of the slide 4 by means of screws 26 which pass through slots 27 in the plate and are provided with heads overlying the plate. The plate may be adjusted upon the slide to vary the length of loops formed by the looper fingers, and is held in adjusted position by means of a clamping bolt 28 mounted in a vertical lug 29 and arranged to engage a rod 30 which extends through the lug and is secured in a similar lug on the slide 4. The bolt 28 is provided with an operating lever 31 by which it may be operated to clamp the rod 30 or to disengage the rod when the plate is to be adjusted. The blocks 24 are mounted for lateral adjustment in the front end of the plate 25, so that they may be moved laterally to bring or maintain the looper fingers in proper position between the needles for different adjustments of the needles.

The spindles 19 in which the needles 1 are secured are rocked at proper intervals to bring the hooks in the needles into position to receive the lacing cord, and to thereafter turn the needles into position to hold the loops so that the cord-carrying needle will pass through the loops, by means of crank arms 32 secured to the rear ends of the spindles, and provided with pins 33 engaging a slot in a transverse bar 34. The bar is carried on the forward ends of two bell crank levers 35, the upper ends of which extend upward into the path of shoulders 36 which are formed on the slide 4. When the slide is advanced to bring the looper fingers in front of the hooks in the looper needles, the rear shoulders 36 act on the levers 35, moving the bar 34 downward, and thus turning the needles into position to bring the hooks upward where they may receive the lacing cord. When the slide 4 is retracted, and the looper fingers have engaged the cord, and coöperating with the needles have formed loops in the cord, the front shoulders 36 act upon the levers 35, raising the bar 34 and turning the needles through an angle of 90 degrees, so that the loops are held by the needles in position for the passage of the cord carrying needle through the loops.

In order that the looper fingers may be automatically maintained in proper relation to the needles when the needles are adjusted for different spacings of eyelets, each of the looper fingers to the left of the movable needles is connected with the corresponding needle, so that these looper fingers are adjusted with the needle. In the construction shown, the connections between the needles and loopers is effected by forming lugs 37 on the rear ends of the needle-carrying blocks 20 which embrace the front ends of the looper-carrying blocks (Figs. 5 and 6).

The cord feeding needle 38 is secured in the arm 39 of a needle carrying slide 40 which is mounted to slide in ways 41. The needle carrying slide is reciprocated by means of a cam 42 which engages a roll on the rear end of a lever 43, the front end of which is provided with a segment 44. The segment 44 engages a pinion 45 which is connected with a gear 46 engaging a rack 47 on the needle carrying slide. The lacing cord leads from the eye of the needle 38 through two guides 48 arranged on opposite sides of a lever 49, the lower end of which is arranged to engage and frictionally clamp the cord between the guides 48. The lever 49 is forced yieldingly into clamping position by a spring 50, and is operated to relieve the tension on the cord when the needle is in its retracted position, by a cam 51 arranged to engage a roll on the upper end of the lever.

The machine is provided with a work guard 52 adjustably secured to a plate 53 and provided at its front end with an eye 54 through which the lacing cord passes from the left hand looper finger to the eye of the cord feeding needle when the needle is in its retracted position, Fig. 14. The guard is also provided with fingers 55 between which the cord feeding needle reciprocates, and which act to steady the needle during its advance stroke. A slack thread device 56 is also mounted upon the front end of the work guard. This device consists of a finger projecting from a plate 57 and held upon the end of the guard by a screw 58 which passes through a slot in the plate. The lower edge of the plate is provided with a notch arranged to engage a pin 59 and retain the plate in position. The slack thread device may be moved into the position indicated in Fig. 14 where the lacing cord will be drawn over the finger 56 when the cord feeding needle passes the cord through the loops which have been passed through the eyelet holes of the upper, thus forming slack in the lacing. In case it is not desired to form slack in the lacing, the device may be moved out of operative position by sliding the plate 57 upward until the notch in the lower edge of the plate disengages the pin 59, and then swinging the plate upward about the screw 58.

After the upper has been placed on the needles and the loops carried by the needles thus passed through the eyelet holes of the upper, the carrier for the looper needles and looper fingers is moved upward to bring the loops carried by the needles into line with the cord feeding needle 38, so that the needle on its forward stroke carries the cord through the loops on the needles. In order that the upper may be held in such position upon the needles that it will be out of the path of the cord carrying needle during its advance stroke, a work positioning and holding device is provided which automatically acts to position the upper upon the needle in case the operator has not accurately positioned it, and to hold the upper in position upon the needle against movement into the path of the cord feeding needle. In the construction shown, this work positioning device comprises two work-engaging fingers 60 and 61. These work-engaging fingers extend downward from a bar 62 formed on the outer end of a lever 63. The front end of the lever 63 passes through and is supported in a head 64 which is pivotally mounted on the frame of the machine above the needle and looper carrier. The rear end of the lever 63 is provided with a yoke 65 the arms of which are pivotally connected with the lug 29 on the upper side of the plate 25 which carries the looper fingers. The work-positioning device is thus connected with the slide which carries the looper fingers, so that it is adjusted with the looper fingers and advanced and retracted therewith to maintain it in proper relation thereto for properly positioning and holding the work, and to enable the removal of the work from the needles when the looper fingers are advanced.

The work-engaging finger 60 is arranged to engage the upper near the upper eyelet through which the lacing cord is passed, and the work-engaging finger 61 is arranged to engage the upper close to the lower eyelet. In order that the position of the work-engaging finger 61 may be varied to correspond with the variations in the positions of the needle when adjusted for differently spaced eyelets, the finger is adjustably mounted in the bar 62, and in order that this adjustment may be effected simultaneously with the adjustment of the needles, the finger is connected with the needle adjacent to which it acts, so as to move with the needle when laterally adjusted. As shown, the work-engaging finger 61 is supported from a block 66 mounted to slide within a guideway 67 formed in the bar 62. The finger is connected with the block 24 which carries the left hand looper finger by means of an arm 68, the rear end of which is pivoted to the block, and the front end of which is forked and is arranged to embrace the upper part of the finger 61. The front end of the forked arm 68 is supported by engagement with shoulders 69 formed on the finger 61. By means of this connection the finger 61 is moved in unison with the left hand looper needle and the connection is such that it does not interfere with the relative movements between the carrier for the looper needles and loopers and the work-positioning device.

When the looper needles are moved upward to bring the loops into position for the passage of the cord feeding needle, the upper carried on the needles passes up back of the work-engaging fingers 61 and 62, the fingers acting to press the work back upon the needles and to restrain it from springing forward into the path of the cord feeding needle. The finger 61 engages the upper close to the lower eyelet and acts to retain the lower edge of the quarters in proper position upon the needle, even when the lower edges of the quarters adjacent to the lower eyelets are unattached to the vamp, as in lacing bluchers. When the looper fingers move forward longitudinally of the needles to remove the laced upper from the needles, the lever 63 upon which the work-engaging fingers are carried moves forward with the loopers so that the fingers do not interfere with the removal of the upper.

In order to provide slack in the lower part of the lacing, the looper finger which engages the lacing cord between the needles which pass the loops through the two lower eyelets is extended to form a cord engaging device 70 with which the lacing cord remains in engagement, and from which the upper is suspended when it is removed from the needles preparatory to tying the ends of the lacing together. During the tying of the ends of the lacing together, the lacing cord remains upon the extension 70 of the looper finger, so that some of the slack in the lacing is retained in the lower part of the lacing. When the ends of the lacing are released, and the upper falls, the lacing slides down the vertical part 71 of the thread-engaging device and brings up against the curved lower end 72, so that the fall of the upper is momentarily arrested and a pull put upon the lacing which draws some of the slack into the lower part of the lacing. The cord immediately slides off the curved lower part 72 of the thread-engaging device and drops away from the machine.

The grippers 73 and 74 for grasping the ends of the lacing are arranged at the right of the lace inserting devices, and coöperate with a plate 75 in gripping the cord. The grippers are in the form of fingers which project forward from the lower ends of two sliding bars 76 and 77, and these bars are moved at proper intervals through levers 78 and 79 (Figs. 9 and 10). The front end of the levers engage recesses in the rear sides of the gripper bars, and the lower side of each recess is formed by the upper end of a section 80 which is held against the end of the lever by a spring 81. When the gripper bar is forced downward to grip the cord, the spring 81 will yield after the gripper has engaged the cord, so that the gripping force is transmitted through the spring 81. The spring 81 thus constitutes one form of yielding connection in the gripper operating means which allows the gripper to automatically adjust itself to different sizes of cord, and to effectively grip the cord under all conditions.

The gripper 73 is arranged to grip the free end of the cord when the cord feeding needle advances, so that on the return stroke of the needle the cord is fed into position to be engaged by the hooks of the looper needles. The cord at this time lies in front of a guide-bar 82, and when the loops are formed by the needles and looper fingers the cord draws across this guide-bar, being retained in position on the bar by engagement with a notch 83 (Fig. 10). The bar 82 also acts as a guard behind which the work lies during the passage of the cord through the loops after they have been passed through the eyelet holes of the upper.

The gripper 74 is arranged and operated to grip the lacing cord carried by the cord feeding needle after the needle has passed through the loops carried by the looper needles. After the cord has been gripped, and the cord feeding needle has started on its return stroke, the cord leading from the gripper to the eye of the needle draws over the gripper finger 74, and after the needle has returned a sufficient distance to provide a free end of thread projecting through the eye of the needle, the cord is severed at the gripper 74 by the action of a knife 84 which is formed on the lower end of a knife bar 85. The knife bar 85 is mounted to bear against the surface of the gripper bar 77 and the knife edge on the lower end of the bar coöperates with the upper outer edge of the gripper finger 74 to sever the cord drawn over the finger. By this construction the proper severing of the cord is insured, and the knife is held at all times in accurate cutting relation to the edge of the gripper finger, without requiring care in the adjustment of the knife, or requiring frequent adjustment to compensate for wear. In order to insure that the cord shall be drawn taut at the moment when the cutter acts and to insure the complete separation of the ends of the thread, a cam 86 (Figs. 1 and 5) may be provided for engaging the roll on the upper end of the tension lever 49, and forcing the lower end of the lever firmly against the cord so that a pull is put upon the cord at the time when the cutter acts.

The operating levers 78 and 79 for the gripper bars are rocked at proper intervals through a lever 87, the lower end of which is provided with a roll engaging a cam 88, and the upper end of which is forked to embrace the rear ends of the levers 78 and 79, and is provided with pins 89 passing through segmental slots 90 and 91 formed in the rear ends of the levers 78 and 79 respectively. When the upper end of the lever 87 is swung to the left in Fig. 9, so that pins 89 are in the forward ends of the slots 90 and 91, both the gripper bars will be in raised position. When the gripper 84 is to be operated to clamp the cord, the lever 87 is moved to the right into the position indicated in Fig. 9. During this movement one pin 89 moves idly in the slot 91, so that the gripper 85 is not operated. The curve of the slot 90 is such, however, that this movement of the lever 87 rocks the lever 78, forcing the gripper 73 into gripping position. When the gripper 74 is to be operated to grip the cord, the lever 87 is moved to the right in Fig. 9. During this movement one pin 89 works idly in the slot 90, thus retaining the gripper 73 in gripping position. The other pin 89 also during this movement acts in the slot 91 to rock the lever 79, and force the gripper 74 into gripping position. When the grippers are to be raised to release the ends of the lacing cord, the lever 87 is thrown to its extreme left position.

The cutter bar 85 is operated through a lever 92, the front end of which engages a recess in the cutter bar and the rear end of which is connected by means of a link 93 to a lever 94 which is rocked at proper intervals by a cam 95 (Figs. 3 and 4).

During the return stroke of the cord feeding needle after it has given the free end of the cord to the gripper 73, and is laying the cord in position to be engaged by the hooks of the looper needles, the cord between the gripper and the guide-bar 82 is acted upon by a thread arm 96 which is arranged in front of the cord, and at this time is moved rearwardly to draw slack cord from the cord supply. When the looper fingers are coöperating with the needles to form the loops in the cord, this thread arm again moves forward to give up its slack cord, so that the loops may be formed with less rendering of cord through the hooks of the needles and around the looper fingers. This thread arm is also provided with a gripper for placing the ends of the lacing cord in the jaws of the knotting mechanism, as will be more fully described in connection with the description of the knotting mechanism.

After the cord feeding needle has passed the cord through the loops held by the looper needles, and the cord has been gripped by the gripper 74 and severed by the knife 84, the two ends of the lacing cord extend side by side across the guide-bar 82 and to the grippers 73 and 74. The ends of the lacing cord are now in position to be acted upon by the knotting mechanism which operates to tie the ends of the lacing together. In the construction shown, the knotting mechanism is constructed to form a loop in the lacing cords, and to draw a bight of the cords through the loop, and to then tighten the knot thus formed. As shown in Figs. 10, 11 and 12, the knotting mechanism is provided with a looping post 97 formed by the lower ends of two semi-cylindrical members 98 and 99. These members are mounted in a sleeve 100, and are provided at their lower extremities with coöperating jaws 101 and 102 for gripping the cord. During the tying of the knot the members 98 and 99 are rotated to form a loop about the post 97, and are also moved longitudinally to grip the cord between the jaws 101 and 102 and draw it through the loop. The sleeve 100 is rotated to impart rotary movements to the members 98 and 99 through a pinion 103 which is engaged by a segmental gear 104. This gear is formed on the front end of a lever 105, the rear end of which is acted upon by a cam 106. The members 98 and 99 are connected to the sleeve 100 by means of a bar 107 extending through a slot 108 formed in the adjacent faces of the members, so that the members will rotate with the sleeve while being free to move longitudinally therein.

Longitudinal movements are imparted to the members 98 and 99 by means of levers 109 and 110, the forward ends of which are connected to the members, and the rear ends of which are engaged by cams 111 and 112.

The looping post 97 is provided with a cord retaining latch 113 which is formed upon a slide 114. The slide 114 is mounted in a transverse recess in the inner face of the member 98, so that the latch is moved radially of the looping post by the sliding movements of the slide. The latch is so formed that when the end of the latch is in engagement with the looping post, an eye 115 is formed at the side of the post in which the lacing cord lies during the formation of the loop on the looping post. A half sleeve 116 is secured upon the lower end of the sleeve 100, and is provided at its lower end with a finger 116ª arranged to lie within a slot in the member 99, and to act to strip the loop of cord off the looping post when the post is drawn upward within the sleeve. The sliding latch 113—114 is operated to move the end of the latch toward and away from the post 97, and to retain the latch in either open or closed position by means of cam surfaces 117 and 118 formed on the sleeve 116 and arranged to coöperate with cam surfaces 119 and 120 formed on the latch.

During the advance and return stroke of the cord feeding needle in presenting the free end of the thread to the gripper 73, and feeding the thread into position to be engaged by the hooks of the looper needles, and during its forward stroke in passing the cord through the loops held by the looper needles, and during a part of its return stroke, the looping post 97 and the latch are in their upper position, and thus the knotting mechanism is out of position to receive and act upon the lacing cord, and where it cannot be engaged by or interfere with the movements of the cord feeding needle, or interfere with the proper feeding of the cord. During the return stroke of the cord feeding needle, after it has given the cord to the gripper 74 and the cord has been severed, the members 98 and 99 are moved downward to carry the looper post 97 and latch 113 on opposite sides of the ends of the lacing cord, and thus bring the lacing cord into the eye 115 between the latch and post. After the lower end of the latch 113 has passed below the lacing cord, the cam surface 120 engages the cam surface 118, and the latch is moved radially toward the looping post, so that its lower end engages the post, thus closing the eye 115. The latch is locked in this position by the surfaces 118 and 120 during the rotation of the post to form the loop, and until the post is raised to cast off the loop, at which time the cam surfaces 117 and 119 act to open the latch so that the loop is free to pass off the looping post.

By arranging the knotting mechanism out of position to act upon the lacing cord, and moving it into position to act upon the lacing cord after the ends of the cord have been presented to the grippers and are in position to be tied together, the necessity for locating the looping post and latch close to the path of the cord feeding needle, so that the needle will pass through the eye formed between the latch and post, is avoided, and there is no danger of the needle striking the latch, or of passing so close to the latch that the thread is engaged by the latch and drawn from the eye of the needle during the forward stroke of the needle in presenting the free end of the thread to the gripper. This construction and arrangement also enables the latch to lie closer to the looping post, and thus contributes to the compactness of the knotting mechanism. By constructing the latch to slide, and providing means for locking it in position, the construction of the knotter is simplified and its action rendered certain by preventing opening of the latch under pressure exerted thereon by the cord in the knotting operation.

After the knotting mechanism has moved into position to act upon the lacing cord, and the latch on the looper post has closed over the lacing cord, the upper is forced off the looper needles by the forward movement of the looper fingers, and falls away from the needles, so that it is supported by the thread engaging device 70 and by the ends of the lacing cord which pass through the eye 115 of the knotting mechanism, and are held by the grippers 73 and 74. When the upper falls into this position the two strands of the lacing cord leading from the grippers through the latch of the knotting mechanism to the upper lie against a lateral extension 121 formed at the lower end of the bar 82. This lateral extension extends below and in front of the knotting mechanism, and is provided with a forwardly projecting pin 122 which prevents the lacing from swinging too far to the right. The front face of the extension 121 is curved, and forms a fixed jaw against which the lacing is gripped by a clamping plate 123 during the knot tightening operation. The clamping plate 123 is formed on the forward end of a sliding bar 124 which is operated to give the proper movements to the clamping plate through a lever 125, the upper end of which is connected by a link 126 with the rear end of the bar, and the lower end of which is acted upon by a cam 127.

The clamping plate 123 not only acts to grip the lacing cord during the knot tightening operation, but it is also utilized as a means for controlling the opening and closing of the gripper jaws mounted on the thread arm 96, and which acts to grip the ends of the lacing cord and carry the cord into position to be engaged by the jaws 101 and 102 of the knot-tying mechanism, as will be more fully described.

The gripping device for gripping the ends of the lacing and placing them in the jaws of the knotting mechanism consists of a fixed jaw 128 which extends rearward from the lower end of the thread arm 96, and a movable jaw 129 arranged to coöperate with the fixed jaw. The movable jaw 129 is in the form of a thin plate arranged to overlie the jaw 128, and provided with an upturned front end for guiding the lacing cord between the jaws, and with a finger 130 arranged to project down at the side of the jaw 128 and position the cord between the jaws. The gripping plate 129 is pivoted on the thread arm 96, and is provided with a depending operating arm 131. The gripping plate 129 is forced yieldingly toward the fixed jaw 128 by a spring 132.

After the upper has been removed from the needles, the thread arm 96 carrying the gripping jaws 128 and 129 moves rearwardly, the spring jaw 129 of the gripping device passing over the lacing cord between the knot forming mechanism and the clamps 73 and 74, and the operating arm 131 of the jaw 129 riding on the plate 123 which is moved rearwardly a short distance at this time, but not far enough to engage the lacing cord. During the continued rearward movement of the gripping device the operating arm 131 rides off the plate 123, so that the spring jaw 129 closes against the lacing and grips the lacing against the fixed jaw 128. Just after the gripping device has gripped the ends of the lacing, the grippers 73 and 74 are operated to release the ends of the lacing. About the time the gripping device reaches its rearward position, the looping post 97 is rotated, and after it has nearly completed a revolution, the jaws 101 and 102 are opened and pass on opposite sides of the lacing, which has been drawn by the rearward movement of the gripping device into position to lie between the jaws 101 and 102 as the looping post completes its rotation. The knotter jaws 101 and 102 are then closed, and are moved upward to draw the lacing through the loop on the looping post which is cast off the ends of the jaws by the finger 116ª and the end of the sleeve 116. After the lacing is gripped by the knotter jaws, the gripping device 128 and 129 is given a further rearward movement to draw the ends of the lacing cord from between the jaws 128 and 129. During the upward movement of the knotter jaws 101 and 102, the clamping plate 123 grips the lacing between the knot and the upper, so that the knot is tightened by the upward movement of the jaws. This insures a uniform tightening of the knot, since the cord is gripped on opposite sides of the knot as the two sets of gripping jaws are moved relatively away from each other.

By placing the ends of the lacing between the gripper jaws by the movement of the gripping device which grips the ends of the lacing, the knot may be formed close to the ends of the lacing, so that there is substantially no waste cord in the ends extending beyond the knot.

Instead of operating the thread gripping device so that the jaws of the knotter will engage the lacing near the ends of the cord, and thus cause the knot to be tied near the ends of the lacing, the gripping device may be operated to draw the lacing through the latch 113 prior to the knotting operation, and thus cause the knot to be formed at some distance from the end of the lacing. When thus operated, the gripping device will therefore act to draw a portion of the slack from the lacing and cause the knot to be formed near to the upper. This is desirable in case the edges of the lacing slit should be held close together when the upper is on the last. When thus operated, the gripping device is moved to its extreme rear position prior to the rotation of the knotting mechanism, the extent of movement of the gripping device depending upon the length of cord which it is desired to draw past the knotting mechanism before the knot is formed. In this case the gripping device continues to hold the ends of the lacing during the upward movement of the knotter jaws and moves forward during such upward movement to give up cord to the knotting mechanism. The jaws of the gripping device are opened to release the lacing in this case by the engagement of the operating arm 131 with the clamping plate 123 as the gripping device reaches its outer position. In either case, after the knot is completed and tightened, and the jaws of the knotter have been opened to release the ends of the lacing and allow the laced upper to drop from the machine, the thread arm 96 which carries the gripping jaws 128 and 129 moves rearward sufficiently to carry the operating arm 131 of the jaw 129 off of the plate 123, so that the jaw 129 closes against the jaw 128. This movement brings the two jaws rearward below the path of the cord feeding needle, so that as the needle makes its forward stroke to carry the free end of the supply cord to the gripper 73, it passes over the jaws. The length of cord fed by the needle into position to be engaged by the hooks of the looper needles therefore passes over the jaw 129, where it will be engaged by the thread arm and may reeve freely over this arm when the arm is retracted to draw slack cord from the supply. When the thread arm moves forward to give up the slack during the forming of the loops by the needles and looper fingers, it moves to its outer position, thus bringing the operating arm 131 into engagement with the clamping plate 123, and opening the gripper jaw 129 preparatory to the rearward movement of the gripping device to grip the ends of the lacing cord as above described.

In order that the action of the gripping device which lays the ends of the lacing cord in the knotter jaws may be readily changed to effect the tying of the knot either near the ends of the lacing or near the upper, two operating cams for the gripping device are provided, and connections for readily connecting either one cam or the other with the gripping device. As shown, the thread arm 96 which carries the gripping device is formed on the forward end of a bar 133, the rear end of which is connected by means of a link 134 with the upper end of an arm 135. The arm 135 is provided with a hub 136 secured to the shaft 135$^a$, and provided with laterally projecting pins 137. These pins are arranged to engage recesses in the hub of an arm 138, which is adjustably connected with the shaft 135$^a$, and is provided with a roll 139 arranged to engage one or the other of two cams 140 and 141. The cam 140 is constructed to give the proper movements to the gripper device when the knot is to be tied at some distance from the ends of the lacing and close to the upper, while the cam 141 is shaped to give the proper movements to the gripper device when the knot is to be tied close to the ends of the lacing. The arm 138 which carries the roll engaging one or the other of the cams is connected with the shaft 135$^a$ by means of a pin 142 mounted in the hub of the arm and having its inner end arranged to engage one or the other of two recesses 143 formed in the shaft 135$^a$. The pin 142 is pressed forward by the action of a leaf spring 144. When the pin 142 is in engagement with the left hand recess 143 (Fig. 13) the roll 139 on the arm 138 is in position to be engaged by the cam 140. When the pin is in the recess 143 at the right, the roll is in position to ride upon the cam 141. The change from one cam to the other may be readily made by drawing the pin 142 from the recess 143 and shifting the arm 138 longitudinally of the shaft 135$^a$ into position for the pin to engage the other recess. In either adjustment of the arm 138 the cam roll 139 is in position to be acted upon by a cam 145, which is shaped and timed to give the proper movements to the thread arm 96 for drawing slack from the supply and giving it up to the looper needles and looper fingers.

The various cams for operating the different parts of the machine are secured upon a cam shaft 146, which is driven through gearing from a pulley 147. The machine is provided with a stop mechanism indicated generally at 148 (Fig. 1), which operates to stop the machine with the parts in the position indicated in the main views. The stop mechanism is operated to start the machine through a treadle (not shown) connected with the rod 149. When the machine is thrown into operation it makes a single revolution and then stops.

The operation of the machine is briefly as follows: When the parts are at rest after the completion of a cycle of operations, one end of the lacing cord is held by the gripper 73, and the cord passes below the knotting mechanism across the guide 82 over the looper fingers and through the hooks of the looper needles, through the thread-eye 54, through the eye of the cord feeding needle 38, through the guides 48, back of the tension lever 49, and thence to the supply. The looper needles are in their lower and advanced position, and the work positioning device is in its upper retracted position. The operator now places the upper on the looper needles and starts the machine. The carrier for the looper needles and fingers moves up to bring the upper back of the work positioning device, which acts to position the work and to retain it in position on the needles back of the path of the cord feeding needle 38. The cord feeding needle now advances to carry the cord through the loops on the looper needles, and gives the cord to the gripper 74. After the needle 38 is moved back a short distance, the lever 49 is operated by the cam 86 to clamp the cord and draw it taut over the gripper finger 74, and the cutter 84 is operated to sever the cord. The knotter jaws then move downward behind the two strands of the lacing cord which lead from the grippers to the upper, the latch 113 passing in front of and below the lacing, and then sliding inward to retain the ends of the lacing on the jaws of the knotting mechanism. The looping fingers and work positioning device then move forward, and the carrier for the looper needles and fingers moves downward, the work positioning device swinging upward slightly. As the carrier reaches its lower position, the looper fingers complete their forward movement and push the upper off the looper needles. The upper now falls down and is supported by the ends of the lacing and by the lacing which engages the thread engaging device 70. The thread arm 96 now moves rearwardly to operate the gripping device 128 and 129, which grips the ends of the lacing cord and carries them rearwardly. The knotter then starts to rotate, and as it completes its rotation the knotter jaws pass on opposite sides of the ends of the lacing and then close. The knotter jaws are then raised to draw the threads through the loop formed on the looping post, and the clamping arm 123 is operated to clamp the lacing between the knot and the upper during the continued upward movement of the knotter jaws, and during the tightening of the knot. After the knot is completed, the jaws of the knotter open, and the clamping plate moves outward so that the upper falls away from the machine, the lower part of the lacing sliding down the part 71 of the thread engaging device, and striking the curved end 72 to draw slack into the lower part of the lacing as the upper falls. During the knot tightening operation the carrier for the looper needle and fingers is moved upward and rearwardly so as to bring the looper needles just below the path of the cord feeding needle and the looper fingers and work positioning device have moved forward so that the looper fingers are in front of the path of the cord feeding needle. The needles have also been turned through an angle of 90 degrees to bring the hooks in the needles upward. After the knot tightening operation has been completed, the cord carrying needle moves across the looper needles and gives the free end of the cord to the clamp 73, and then returns to its retracted position. During the return of the needle the thread arm 96 is moved rearwardly to draw slack from the cord supply. After the cord feeding needle has finished its backward stroke, the carrier for the looper needles is raised slightly to bring the cord into the eyes of the looper needles, and then the looper fingers are moved rearwardly to form the loops between the needles and looper fingers, the work positioning device moving rearwardly with the looper fingers. At the same time the carrier for the looper needles and looper fingers moves downward, and the thread arm moves forward to give up slack to the looper needles and looper fingers. The looper needles also move forward into position to receive the upper. This brings the parts back to their initial position, and the machine is stopped by the stop mechanism.

Having explained the nature and object of the invention, and specifically described one form of machine in which the invention may be embodied, what I claim is:—

1. A machine for lacing shoe uppers, having, in combination, a plurality of needles, means coöperating therewith to form a series of loops in a lacing cord, and a single adjusting mechanism acting when actuated to change the relative lateral position of the needles to space the needles in accordance with the spacing of the eyelet holes in the upper to be laced and to simultaneously maintain the coöperating means in proper relation to the needles, substantially as described.

2. A machine for lacing shoe uppers, having, in combination, a plurality of needles, means coöperating therewith to form a series of loops in the lacing cord, and means for simultaneously adjusting said needles and coöperating means to space the same in accordance with the spacing of the eyelet holes in the upper to be laced, substantially as described.

3. A machine for lacing shoe uppers, having, in combination, a plurality of needles, a plurality of looper fingers coöperating therewith to form a series of loops in a lacing cord, and means for simultaneously adjusting the needles in accordance with the spacing of the eyelet holes in the upper to be laced and automatically maintaining the looper fingers in proper relation thereto, substantially as described.

4. A machine for lacing shoe uppers, having, in combination, a plurality of needles, a plurality of looper fingers coöperating therewith to form a series of loops in the lacing cord, and adjusting mechanism acting when actuated to change the relative lateral position of the needles and of the looper fingers in accordance with the spacing of the eyelet holes in the upper to be laced, substantially as described.

5. A machine for lacing shoe uppers, having, in combination, a plurality of needles, a plurality of looper fingers coöperating therewith to form a series of loops in the lacing cord, and an adjusting mechanism common to the needles and looper fingers for adjusting the same in accordance with the spacing of the eyelet holes in the upper to be laced, substantially as described.

6. A machine for lacing shoe uppers, having, in combination, a plurality of needles, a plurality of looper fingers coöperating therewith to form a series of loops in a lacing cord, means for simultaneously adjusting the needles to space the needles in accordance with the spacing of the eyelet holes in the upper to be laced, and connections between the needles and looper fingers for adjusting the looper fingers with the needles, substantially as described.

7. A machine for lacing shoe uppers, having, in combination, a plurality of needles laterally adjustable for different spacing of eyelet holes in the upper to be laced, a plurality of looper fingers coöperating therewith to form a series of loops in the lacing cord, and connecting devices between the needles and looper fingers for moving the loopers with the needles, substantially as described.

8. A machine for lacing shoe uppers, having, in combination, means for forming a series of loops in a lacing cord and retaining them in position to be passed through the eyelet holes of an upper, means for passing a locking cord through the loops, a work positioner, and means acting to automatically change the relation of the work positioner and loop forming means to retain the work out of the path of the means for passing the locking cord through the loops, substantially as described.

9. A machine for lacing shoe uppers, having, in combination, a plurality of needles, means coöperating therewith to form a series of loops in a lacing cord and retain the loops in position to be passed by the needles through the eyelet holes of an upper, means for passing a locking cord through said loops, a work positioning device, and means to automatically change the relation of the needles and work positioning device to position the work on the needles prior to the passage of the locking cord through the loops, substantially as described.

10. A machine for lacing shoe uppers, having, in combination, a plurality of needles, means coöperating therewith to form a series of loops in a lacing cord and retain the loops in position to be passed by the needles through the eyelet holes of an upper, means for passing a locking cord through said loops, a work positioning device, and means acting to automatically change the relation of the needles and work positioning device to position the work on the needles prior to the passage of the locking cord through the loops and to enable the removal of the work from the needles, substantially as described.

11. A machine for lacing shoe uppers, having, in combination, means for forming a series of loops in a lacing cord and retaining them in position to be passed through the eyelet holes of an upper, means for passing a locking cord through the loops, and a work positioning device acting to position the work on the loops and adjustable for different spacings of the loops, substantially as described.

12. A machine for lacing shoe uppers, having, in combination, a plurality of needles arranged to pass a series of loops of lacing cord through the eyelet holes of an upper adjustable for different spaced eyelet holes, and a work positioning device for positioning the work on the needles and adjustable for different spacings of the needles, substantially as described.

13. A machine for lacing shoe uppers, having, in combination, means for forming a series of loops in a lacing cord and retaining them in position to be passed through the eyelet holes of an upper, means for passing a locking cord through the loops, and a work positioning device having a work engaging finger arranged to engage the work close to the lower eyelet, substantially as described.

14. A machine for lacing shoe uppers, having, in combination, means for forming a series of loops in a lacing cord and retaining them in position to be passed through the eyelet holes of an upper adjustable for differently spaced eyelets, means for passing a locking cord through the loops, and a work positioning device having a work engaging finger arranged to engage the work close to the lower eyelet, and provision for adjusting the finger to correspond to the adjustment of the loop forming means, substantially as described.

15. A machine for lacing shoe uppers, having, in combination, a plurality of needles arranged to pass a series of loops of lacing cord through the eyelet holes of an upper, a work positioning device provided with work engaging fingers, and means for adjusting the needles and one of the fingers for differently spaced eyelets, substantially as described.

16. A machine for lacing shoe uppers, having, in combination, a plurality of needles arranged to pass a series of loops of lacing cord through the eyelet holes of an upper, a work positioning device provided with a work engaging finger arranged to engage the work close to the lower eyelet, and means for adjusting the finger to correspond with the adjustment of the needles, substantially as described.

17. A machine for lacing shoe uppers, having, in combination, a plurality of needles arranged to pass a series of loops of lacing cord through the eyelet holes of an upper, a work positioning device provided with a work engaging finger arranged to engage the work close to the needle corresponding to the lower eyelet, means for adjusting the needles to correspond with the spacing of eyelet holes in the upper to be placed, and devices connecting said needle and finger, substantially as described.

18. A machine for lacing shoe uppers, having, in combination, a plurality of needles, a plurality of looper fingers coöperating therewith to form a series of loops in the lacing cord, a work positioning device for positioning the upper on the needles, and means for moving the work positioning device longitudinally of the needles with the looper fingers, substantially as described.

19. A machine for lacing shoe uppers, having, in combination, a plurality of needles, a plurality of looper fingers coöperating therewith to form a series of loops in the lacing cord, means for operating the loopers, and a work positioning device connected with the looper operating means to move longitudinally of the needles with the looper fingers, substantially as described.

20. A machine for lacing shoe uppers, having, in combination, a plurality of needles, a plurality of looper fingers coöperating therewith to form a series of loops in the lacing cord, means for passing a locking cord through the loops, a work positioning device arranged back of the path of the locking cord, and means for causing a relative movement between the needles and looper fingers and the work positioning device to bring the work back of the work positioning device prior to the passage of the locking cord, substantially as described.

21. A machine for lacing shoe uppers, having, in combination, a plurality of needles, a plurality of looper fingers coöperating therewith to form a series of loops in the lacing cord, a cord carrying needle for passing a locking cord through the loops, a work positioning device, means for causing a relative movement between the needles and looper fingers and the work positioning device to bring the work positioning device into position between the upper and the path of the cord carrying needle prior to the passage of the needle through the loops, substantially as described.

22. A machine for lacing shoe uppers, having, in combination, a plurality of needles, a plurality of looper fingers coöperating therewith to form a series of loops in the lacing cord, a cord carrying needle for carrying the locking cord through the loops, a work positioning device, means for causing a relative movement between the needles and looper fingers and the work positioning device to bring the work positioning device into position between the work and the path of the cord carrying needle prior to the passage of said needle through the loops, and means for causing a relative movement between the needles and the looper fingers and work positioning device longitudinally of the needles after the return of the cord carrying needle, substantially as described.

23. A machine for lacing shoe uppers, having, in combination, means for inserting a lacing cord in the eyelet hole of an upper, mechanism for tying the ends of the lacing together, and means acting on the lower portion of the lacing to provide slack therein, substantially as described.

24. A machine for lacing shoe uppers, having, in combination, means for passing loops of lacing cord through the eyelet holes of an upper, means for passing a lacing cord through the loops, a knotting mechanism for tying the ends of the lacing together, and means acting on the lower portion of lacing to provide slack therein, substantially as described.

25. A machine for lacing shoe uppers, having, in combination, means for inserting a lacing cord in the eyelet holes of an upper, mechanism for tying the ends of the lacing together, and means engaging the lower portion of the lacing during the knotting and drawing slack after the lace is released by the knotter, substantially as described.

26. A machine for lacing shoe uppers, having, in combination, means for passing loops of lacing cord through the eyelet holes of an upper, means for passing a locking cord through the loops, knotting mechanism for tying the ends of the lacing together, and means for suspending the work during the knotting by the ends of the lacing and by the lacing adjacent the lower laced eyelets, substantially as described.

27. A machine for lacing shoe uppers, having, in combination, a plurality of needles arranged to pass a series of loops of lacing cord through the eyelet holes of an upper, means for passing a locking cord through the loops, mechanism for tying the ends of the lacing together, and means from which the upper is suspended after the upper is freed from the needles and until after the completion of the knotting operation arranged to engage the lower portion of the lacing, substantially as described.

28. A machine for lacing shoe uppers, having, in combination, a plurality of needles, a plurality of looper fingers coöperating therewith to form a series of loops in a lacing cord and retain the loops in position to be passed by the needles through the eyelet holes of an upper, one of said looper fingers being provided with a cord engaging device from which the upper is suspended when freed from the needles, substantially as described.

29. A machine for lacing shoe uppers, having, in combination, a plurality of needles, a plurality of looper fingers coöperating therewith to form a series of loops in a lacing cord and retain the loops in position to be passed by the needles through the eyelet holes of an upper, one of the looper fingers being extended to form a cord engaging device from which the upper is suspended when freed from the needles, substantially as described.

30. A machine for lacing shoe uppers, having, in combination, a plurality of needles, a plurality of looper fingers coöperating therewith to form a series of loops in a lacing cord and retain the loops in position to be passed by the needles through the eyelet holes of an upper, one of the looper fingers being extended to form a cord engaging device from which the upper is suspended when freed from the needles, and a shoulder on the extension for arresting the fall of the upper, substantially as described.

31. A machine for lacing shoe uppers, having, in combination, mechanism for inserting a lacing cord in the eyelet holes of an upper, a knot tying mechanism arranged to act upon the lacing, and a gripper arranged to grip the lacing on the work side of the knot during the tightening of the knot, substantially as described.

32. A machine for lacing shoe uppers, having, in combination mechanism for inserting a lacing cord in the eyelet holes of an upper, a knot-tying mechanism arranged to act upon the lacing, a gripper arranged to grip the lacing on the work side of the knot, and means for causing a relative movement between the knot-tying mechanism and the gripper to tighten the knot, substantially as described.

33. A machine for lacing shoe uppers, having, in combination, means for passing a series of loops of lacing cord through the eyelet holes of an upper, means for passing a locking cord through said loops, a knot-tying mechanism arranged to act upon the lacing beyond the loops, and a gripper on the work side of the knot coöperating with the knot-tying mechanism to tighten the knot formed thereby, substantially as described.

34. A machine for lacing shoe uppers, having, in combination, means for passing a series of loops of lacing cord through the eyelet holes of an upper, means for passing a locking cord through said loops, a knot-tying mechanism arranged to act upon the lacing beyond the loops, and a gripper arranged to grip the lacing on the work side of the knot during the tightening of the knot, substantially as described.

35. A machine for lacing shoe uppers, having, in combination, means for passing a series of loops of lacing cord through the eyelet holes of an upper to partially form a lacing, means for passing a portion of said cord through said loops to complete the lacing, a knot-tying mechanism arranged to act on the ends of the lacing, and a gripper arranged to grip the lacing on the work side of the knot during the tightening of the knot, substantially as described.

36. A machine for lacing shoe uppers, having, in combination, means for passing a series of loops of lacing cord through the eyelet holes of an upper to partially form the lacing, means for passing a portion of said cord through said loops to complete the lacing, a knot-tying mechanism arranged to act on the ends of the lacing, a gripper arranged to grip the lacing on the work side of the knot, and means for causing a relative movement between the knot-tying mechanism and the gripper to tighten the knot, substantially as described.

37. A machine for lacing shoe uppers, having, in combination, means for passing a series of loops of lacing cord through the eyelet holes of an upper to partially form the lacing, means for passing a portion of said cord through said loops to complete the lacing, a knot-tying mechanism arranged to act on the ends of the lacing, a gripper arranged to grip the lacing on the work side of the knot, and means for moving the knot-tying mechanism away from the gripper to tighten the knot, substantially as described.

38. A machine for lacing shoe uppers, having, in combination, means for inserting a lacing cord in the eyelet holes of an upper, including a cord carrying needle, grippers to which the ends of the lacing are delivered by the needle, a knot-tying mechanism arranged out of position to act on the lacing during the advance stroke of the needle, and means for moving said knot-tying mechanism into and out of position to act on the lacing adjacent the grippers, substantially as described.

39. A machine for lacing shoe uppers, having, in combination, means for forming a series of loops in a lacing cord and passing them through the eyelet holes of an upper, a cord feeding needle arranged to feed cord to the loop forming means and pass a portion of said cord through said loops, cord grippers arranged to grip the free end of the cord and the end of the portion of the cord passed through the loops, a knot-tying mechanism arranged out of position to act on the lacing during the advance stroke of the needle, and means for moving said knot-tying mechanism into and out of position to act on the lacing adjacent the grippers, substantially as described.

40. A machine for lacing shoe uppers, having, in combination, means for forming and passing a series of loops of lacing cord through the eyelet holes of an upper, means for passing a portion of said cord through said loops to complete the lacing, means for holding the ends of the lacing, a knot-tying mechanism, and means for moving the knot-tying mechanism into position to act upon the ends of the lacing after the passage of the cord through the loops and out of said position prior to the succeeding operation of the loop forming means, substantially as described.

41. A machine for lacing shoe uppers, having, in combination, means for forming a series of loops in a lacing cord and passing them through the eyelet holes of an upper, cord carrying means for presenting the cord to the loop-forming means and passing a locking cord through the loops, means for holding the ends of the lacing, knot-tying mechanism arranged out of position to act upon the ends of the lacing, and means for moving the knot-tying mechanism into position to act upon the lacing after the passage of the cord through the loops, substantially as described.

42. A machine for lacing shoe uppers, having, in combination, means for inserting a lacing cord in the eyelet holes of an upper, including a cord carrying needle, grippers to which the ends of the lacing are delivered by the needle, a knot-tying mechanism provided with a lace retaining latch, and means for causing a relative movement between the knot-tying mechanism and the lacing transversely of the lacing to bring the lacing within the latch, substantially as described.

43. A machine for lacing shoe uppers, having, in combination, means for inserting a lacing cord in the eyelet holes of an upper, including a cord carrying needle, grippers to which the ends of the lacing are delivered by the needle, a knot-tying mechanism provided with a lace retaining latch, and means for moving the knot-tying mechanism toward the path of the needle to bring the lacing within the latch, substantially as described.

44. A machine for lacing shoe uppers, having, in combination, mechanism for inserting a lacing in the eyelet holes of an upper, mechanism acting to tie the ends of the lacing together, and means coöperating therewith to cause the knot to be tied either close to the ends of the lacing or close to the upper, substantially as described.

45. A machine for lacing shoe uppers, having, in combination, means for passing a series of loops of lacing cord through the eyelet holes of an upper, means for passing a locking cord through said loops, a knot-tying mechanism arranged to act on the ends of the lacing, and means coöperating therewith to vary the location of the knot, substantially as described.

46. A machine for lacing shoe uppers, having, in combination, means for passing a series of loops of lacing cord through the eyelet holes of an upper, means for passing a locking cord through said loops, grippers arranged to grasp the ends of the lacing, a knot-tying mechanism arranged to act on the lacing adjacent the grippers, a device arranged to engage the lacing between the knot-tying mechanism and grippers to draw the lacing, and operating means for said device adjustable to vary the location of the knot, substantially as described.

47. A machine for lacing shoe uppers, having, in combination, means for passing a series of loops of lacing cord through the eyelet holes of an upper, means for passing a locking cord through said loops, grippers arranged to grasp the ends of the lacing, a knot-tying mechanism provided with jaws arranged to act upon the lacing adjacent the grippers, a gripper arranged to grip the lacing between said grippers and the knot-tying mechanism, and means for operating said gripper to place the lacing between the jaws of the knot-tying mechanism, substantially as described.

48. A machine for lacing shoe uppers, having, in combination, means for passing a series of loops of lacing cord through the eyelet holes of an upper, means for passing a locking cord through said loops, grippers arranged to grasp the ends of the lacing, a knot-tying mechanism provided with jaws arranged to act upon the lacing adjacent the grippers, a gripper arranged to grip the lacing between said grippers and the knot-tying mechanism, and means for operating said gripper to place the lacing between the jaws of the knot-tying mechanism adjustable to vary the location of the knot, substantially as described.

49. A machine for lacing shoe uppers, having, in combination, means for passing a series of loops of lacing cord through the eyelet holes of an upper, means for passing a locking cord through said loops, grippers arranged to grasp the ends of the lacing, knot-tying mechanism provided with jaws and arranged to act upon the lacing adjacent the grippers, a thread arm provided with a gripper, and means for actuating the thread arm to draw cord from the supply prior to the formation of the loops and to actuate the arm and gripper thereon to grasp the ends of the lacing and place them in the jaws of the knotter after the lacing is completed, substantially as described.

50. A machine for lacing shoe uppers, having, in combination, means for passing a series of loops of lacing cord through the eyelet holes of an upper, means for passing a locking cord through said loops, knot-tying mechanism arranged to act on the lacing and provided with jaws, and a gripper arranged to grip the ends of the lacing and place them in said jaws, substantially as described.

51. A machine for lacing shoe uppers, having, in combination, means for inserting a lacing cord in the eyelet holes of an upper, grippers arranged to grasp the ends of the lacing, a knot-tying mechanism arranged to act on the lacing between the grippers and the upper, and means for varying the position of the knot, substantially as described.

52. A machine for lacing shoe uppers, having, in combination, means for inserting a lacing cord in the eyelet holes of an upper, a knot-tying mechanism provided with jaws, a gripper arranged to grasp the ends of the lacing, and means for operating the gripper to place the ends of the lacing in the jaws of the knot-tying mechanism, substantially as described.

53. A machine for lacing shoe uppers, having, in combination, means for passing a series of loops of lacing cord through the eyelet holes of an upper, means for passing a locking cord through said loops, a gripper over which the locking cord is drawn, and a reciprocating cutter coöperating with the edge of the gripper to sever the cord, substantially as described.

54. A machine for lacing shoe uppers, having, in combination, means for passing a series of loops of lacing cord through the eyelet holes of an upper, means for passing a locking cord through said loops, a gripper over which the locking cord is drawn, a cutter coöperating with the edge of the gripper to sever the cord, and means for applying tension to the cord when severed, substantially as described.

55. A machine for lacing shoe uppers, having, in combination, means for passing a series of loops of lacing cord through the eyelet holes of an upper, a cord feeding needle for passing a locking cord through said loops, a gripper over which the cord is drawn by the needle, and a reciprocating cutter coöperating with the edge of the gripper to sever the cord, substantially as described.

56. A machine for lacing shoe uppers, having, in combination, means for inserting a lacing cord in the eyelet holes of an upper, including a cord feeding needle, a gripper over which the cord is drawn by the needle, and a reciprocating cutter coöperating with the edge of the gripper to sever the cord, substantially as described.

57. A machine for lacing shoe uppers, having, in combination, means for passing a series of loops of lacing cord through the eyelet holes of an upper, means for passing a locking cord through said loops, grippers arranged to grasp the ends of the lacing, and means for operating the grippers to clamp the lacing including yielding connections to automatically compensate for different sizes of cord, substantially as described.

58. A machine for lacing shoe uppers, having, in combination, mechanism for inserting lacing cord in the eyelet holes of an upper, including a cord feeding device, grippers to which the ends of the lacing are given by the feeding device, and means for operating the grippers to clamp the lacing including yielding connections to automatically compensate for the different sizes of cord, substantially as described.

59. A machine for lacing shoe uppers, having, in combination, mechanism for inserting lacing cord in the eyelet holes of an upper, including a cord feeding device, and grippers for grasping the ends of the lacing provided with springs through which gripping movements are imparted thereto, substantially as described.

In testimony whereof I affix my signature, in presence of two witnesses.

HERBERT E. ENSLIN.

Witnesses:
 IRA L. FISH,
 N. D. MCPHAIL.

---

Copies of this patent may be obtained for five cents each, by addressing the "Commissioner of Patents, Washington, D. C."